(12) United States Patent
Schaefer

(10) Patent No.: US 6,921,177 B2
(45) Date of Patent: Jul. 26, 2005

(54) HIGH PRECISION MIRROR, AND A METHOD OF MAKING IT

(75) Inventor: John P. Schaefer, Plano, TX (US)

(73) Assignee: Raytheon Company, Lexington, MA (US)

( * ) Notice: Subject to any disclaimer, the term of this patent is extended or adjusted under 35 U.S.C. 154(b) by 82 days.

(21) Appl. No.: 10/373,448

(22) Filed: Feb. 24, 2003

(65) Prior Publication Data

US 2004/0165296 A1 Aug. 26, 2004

(51) Int. Cl.$^7$ ............................................. G02B 7/182
(52) U.S. Cl. ...................................... 359/883; 359/884
(58) Field of Search ................................. 359/883–884, 359/876, 359, 900, 589, 608, 584, 585, 868, 869, 726, 727, 728

(56) References Cited

U.S. PATENT DOCUMENTS

| | | | | |
|---|---|---|---|---|
| 3,947,302 A | * | 3/1976 | Grossman | 216/33 |
| 4,814,232 A | * | 3/1989 | Bluege et al. | 428/450 |
| 4,865,451 A | * | 9/1989 | Ahonen et al. | 356/469 |
| 5,717,532 A | * | 2/1998 | Chiba et al. | 359/868 |
| 5,912,777 A | * | 6/1999 | Jaworske | 359/883 |
| 5,933,278 A | * | 8/1999 | Plummer et al. | 359/627 |
| 6,078,425 A | * | 6/2000 | Wolfe et al. | 359/584 |
| 6,495,272 B1 | | 12/2002 | Guttin | |
| 6,587,263 B1 | * | 7/2003 | Iacovangelo et al. | 359/359 |
| 6,598,985 B2 | * | 7/2003 | Hagelin et al. | 359/876 |

FOREIGN PATENT DOCUMENTS

EP 0456488 A 11/1991

* cited by examiner

Primary Examiner—Mohammad Sikder
(74) Attorney, Agent, or Firm—Baker Botts L.L.P.

(57) ABSTRACT

A mirror includes: a substrate having a surface; and a thin-film finish layer provided over the surface of the substrate and having on a side thereof opposite from the substrate a surface with a polished finish. According to a different aspect of the invention, a method of making a mirror includes: providing a substrate having a surface thereon; forming a thin-film finish layer over the surface of the substrate using thin-film techniques, the finish layer having a surface on a side thereof opposite from the substrate; and polishing the surface of the finish layer.

29 Claims, 1 Drawing Sheet

HIGH PRECISION MIRROR, AND A METHOD OF MAKING IT

TECHNICAL FIELD OF THE INVENTION

This invention relates in general to mirrors and, more particularly, to the structure and fabrication of high precision mirrors.

BACKGROUND OF THE INVENTION

There are a variety of optical systems in which high precision mirrors are needed. Examples include ultraviolet lithography condenser mirrors, reflective laser scanner mirrors, exo-atmospheric reflecting optics, systems in which low scattering is needed for visible radiation, and a variety of other applications.

One existing technique for making precision metal mirrors is to take a substrate of an aluminum alloy, such as that commonly known in the art as aluminum 6061-T6, and to carry out single point diamond turning (DPT) of a surface on the substrate, which then serves as the reflective surface. This alloy is lightweight, is easily machined by DPT, and has good long-term stability. Unfortunately, however, this aluminum alloy contains alloy elements such as zinc, chromium and iron, which leave defects or artifacts after DPT that effectively limit the surface finish achievable with DPT to approximately 80 Angstroms RMS. A surface finish of this quality provides adequately low scatter for many applications in which the reflected radiation of interest has a relatively long wavelength, such as a wavelength greater than 3 microns. At shorter wavelengths, however, such as the wavelength of visible radiation, a surface finish of 80 Angstroms RMS produces a level of scatter which is too high for many applications.

In attempt to address this problem, one prior technique took the approach of plating electroless nickel over the DPT surface on the Aluminum 6061-T6 substrate, subjecting this nickel layer to DPT, and then post-polishing the nickel layer to improve the surface finish. This alternative approach had several different disadvantages.

In particular, for all such mirrors, there is an inherent mismatch between the coefficient of thermal expansion (CTE) for the aluminum alloy substrate and the CTE for the plated nickel layer. Consequently, and due to the thickness of the nickel layer, there can be a bimetallic effect between the substrate and nickel layer, which causes bending of the mirror surface across the operational temperature range of the mirror. Such bending is undesirable in the context of a high precision mirror surface, because it changes optical characteristics of the mirror surface. In order to keep such bimetallic bending to an acceptable level over normal temperature variations, the plated nickel has to be a thin and uniform layer with a thickness of approximately 0.0005 inch to approximately 0.001 inch. In order to achieve this thin and uniform layer, the above-mentioned DPT operation was needed, in addition to the DPT operation for the aluminum. The need for this second DPT operation added cost and cycle time to the fabrication process.

An alternative technique uses electro-deposited high purity aluminum plating instead of the nickel plating, in order to avoid the thermal mismatch. This process creates a hard aluminum oxide (sapphire) outer layer on the electro-deposited aluminum layer, and this oxide layer damages the diamond tool during cutting. In addition, this high purity aluminum is very soft, and tends to build up on the diamond tool during cutting, which makes the DPT operation difficult. Also, the soft aluminum surface is easily scratched, and difficult to clean. Using this approach, the DPT surface finish is improved to around 40 Angstroms RMS, but the grooves from the DPT are still present, and create undesirable scatter at visible wavelengths.

One final method for improving surface finishes on 6061-T6 aluminum mirrors is to polish the aluminum. This is difficult because of the softness of the aluminum, although some techniques have demonstrated surface finishes of 10 Angstroms RMS. However, bi-directional reflective distribution function (BRDF) scatter testing shows that the resulting aspheric surface on the polished 6061-T6 aluminum layer effectively performs like a 60 Angstroms RMS surface finish, because the surface peak-to-valley variations remain very high as a result of impurities. Obviously, performing comparable to a 60 Angstroms RMS surface finish is not a significant improvement over an 80 Angstroms RMS surface finish, especially in view of the added difficulty and cost involved.

SUMMARY OF THE INVENTION

From the foregoing, it may be appreciated that a need has arisen for a high precision mirror and a method of making it, which avoid at least some of the disadvantages discussed above. One form of the invention involves an apparatus that includes a mirror with: a substrate having a surface; and a thin-film finish layer provided over the surface of the substrate and having on a side thereof opposite from the substrate a surface with a polished finish.

Another form of the invention relates to a method of making a mirror, and includes: providing a substrate having a surface thereon; forming a thin-film finish layer over the surface of the substrate using thin-film techniques, the finish layer having a surface on a side thereof opposite from the substrate; and polishing the surface of the finish layer.

BRIEF DESCRIPTION OF THE DRAWINGS

A better understanding of the present invention will be realized from the detailed description which follows, taken in conjunction with the accompanying drawings, in which.

DETAILED DESCRIPTION OF THE INVENTION

Figure 1:
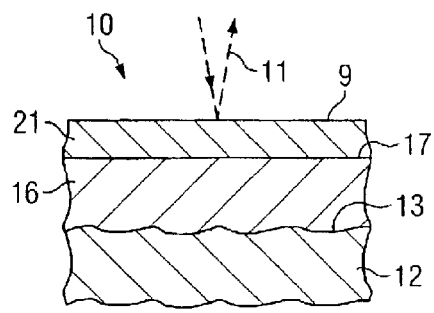
FIG. 1 is a diagrammatic fragmentary sectional view of a mirror which embodies aspects of the present invention.

FIG. 1 is a diagrammatic fragmentary sectional view of a high-precision mirror 10 which embodies aspects of the present invention. The mirror 10 has a high-precision surface 9 which can reflect radiation, as indicated diagrammatically by broken-line arrows 11. The mirror 10 of FIG. 1 is designed for use with visible radiation, but could alternatively be used with other types of radiation. The surface 9 is an aspheric surface, although the portion of the mirror 10 which is visible in FIG. 1 is sufficiently small so that the curvature of the surface 9 is not apparent in FIG. 1. The invention has aspects which are advantageous in the context of an aspheric mirror surface, such as the surface 9, but the invention is not limited to aspheric surfaces.

The mirror 10 has a substrate 12, which in the disclosed embodiment is an aluminum alloy that is readily commercially available from a number of suppliers as aluminum 6061-T6. However, the substrate 12 could alternatively be made from any other suitable material. The 6061-T6 alloy is primarily aluminum, with alloy elements of zinc, chromium and iron, and may also include elements such as magnesium and silicon.

The substrate 12 has a surface 13 thereon. The surface 13 is a precision surface formed using a machining technique which is commonly referred to in the industry as single point diamond turning (DPT). Despite the use of this precision machining technique, the alloy elements in the substrate 12, such as the zinc, chromium and iron, leave defects or artifacts in the finished surface which limit its smoothness to about 80 Angstroms RMS.

After the DPT of the surface 13 has been completed, a finish layer 16 is deposited on the surface 13 using thin-film vapor deposition techniques of a type known in the art. In the embodiment of FIG. 1, the finish layer 16 is a nickel-chromium layer, and has a thickness of approximately 5,000 Angstroms. However, the layer 16 could alternatively be made of any other suitable material, and could have some other suitable thickness. For example, as discussed in more detail later, the layer 16 could alternatively be made of amorphous silicon.

The finish layer 16 has a surface 17 on a side thereof opposite from the substrate 12. The surface 17 is initially somewhat rough, because the finish layer 16 is a thin-film layer, and thus its upper surface will conform to some degree to the contour of the DPT surface 13 on the substrate 12, which as mentioned above will have some defects or artifacts. Therefore, in order to remove peak-to-valley variations in the surface 17, the surface 17 is polished.

In the disclosed embodiment, the polishing of the surface 17 is carried out using a not-illustrated polishing compound and a not-illustrated polishing element or pad. The polishing compound is a material available commercially from GE Micron Products of Deerfield Beach, Fla. under the tradename K-SPRAY DIAMOND ABRASIVE, type SJK-5, size 0.0–0.2 micron, formula K-285T. However, any other suitable material could alternatively be used as the polishing compound. The polishing element is a part available commercially under the tradename TAC'N STIK REUSABLE ADHESIVE from Stockwell Office Products, Westborough, Mass. However, any other suitable element could alternatively be used as the polishing element. In the disclosed embodiment, polishing of the surface 17 removes approximately 500 Angstroms of the material of the finish layer 16. After polishing, the resulting surface 17 has a surface finish of approximately 22 to 25 Angstroms RMS.

A thin reflective layer 21 is then formed on the surface 17 of the finish layer 16, using thin-film vapor deposition techniques of a type known in the art. In the disclosed embodiment, the reflective layer 21 has a thickness of about 2,000 to 5,000 Angstroms, but it could alternatively have any other suitable thickness. Further, the reflective layer 21 is silver, but it could alternatively be any other suitable reflective material, such as gold or aluminum. The outer surface of the reflective layer 21 serves as the reflective surface 9. Since the reflective layer 21 is a thin-film layer provided on the surface 17 of the underlying finish layer 16, the surface 9 on the reflective layer 21 has a surface finish comparable to that of the surface 17, or in other words a surface finish of approximately 22 to 25 Angstroms RMS.

A thin overcoat, which is not shown in the drawings, may be applied over the reflective layer 21, in order to protect the reflective layer and/or to increase the reflectance within a selected waveband. For example, if the mirror 10 was intended for use with radiation in the visible and near infrared wavebands, an overcoat of silicon dioxide ($SiO_2$) with a thickness of about 1,500 Angstroms could be applied over the reflective layer 21 using well-known techniques. However, there is a wide variety of other known materials that, depending on the particular intended use for the mirror, could alternatively be used for the overcoat, including but not limited to silicon oxide (SiO), tantalum oxide ($Ta_2O_5$) titanium oxide ($TiO_2$), zirconium oxide ($ZrO_2$).

Figure 2:
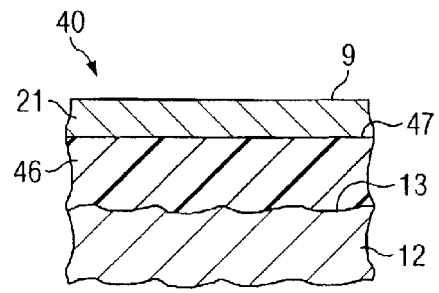
FIG. 2 is a diagrammatic fragmentary sectional view similar to FIG. 1, but showing a mirror which is an alternative embodiment of the mirror of FIG. 1.

FIG. 2 is a diagrammatic fragmentary sectional view similar to FIG. 1, but showing a mirror 40 which is an alternative embodiment of the mirror 10 of FIG. 1. The mirror 40 of FIG. 2 is substantially identical to the mirror 10 of FIG. 1, except that the mirror 40 has a finish layer 46 which is made from amorphous silicon rather than nickel-chromium. Alternatively, the layer 46 could be made from germanium instead of silicon. The silicon layer 46 has a thickness of approximately 5,000 Angstroms, but could alternatively have any other suitable thickness. The procedure for making the mirror 40 is substantially identical to the procedure described above for making the mirror 10, except that amorphous silicon, rather than nickel-chromium, is applied to the surface 13 of the substrate using thin-film vapor deposition techniques.

The finish layer 46 of amorphous silicon in FIG. 2 is somewhat harder than the finish layer 16 of nickel-chromium in FIG. 1. Consequently, although the surface 47 on the finish layer 46 in FIG. 2 is polished in the same manner as the surface 17 on the finish layer 16 in FIG. 1, the surface 47 will exhibit a higher degree of smoothness. In particular, the surface 47 will have a surface finish of approximately 10 to 15 Angstroms RMS.

Figure 3:
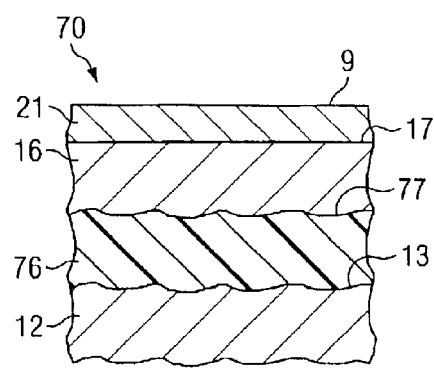
FIG. 3 is a diagrammatic fragmentary sectional view similar to FIG. 1, but showing a mirror which is yet another alternative embodiment of the mirror of FIG. 1.

FIG. 3 is a diagrammatic fragmentary sectional view similar to FIG. 1, but showing a mirror 70 which is yet another alternative embodiment of the mirror 10 of FIG. 1. The mirror 70 of FIG. 3 is substantially identical to the mirror 10 of FIG. 1, except that a thin-film intermediate layer 76 of amorophous silicon is provided between the substrate 12 and the finish layer 16. More specifically, the surface 13 on the substrate 12 is finished with a DPT operation, as discussed above in association with FIG. 1. Then, the layer 76 of amorophous silicon is deposited on the surface 13 of the substrate 12 using thin-film vapor deposition techniques of a type known in the art. The layer 76 has a thickness of approximately 6,000 Angstroms, but could alternatively have some other suitable thickness. The finish layer 16 is then deposited on the surface 77 of the layer 76, using thin-film vapor deposition techniques of a type known in the art, in the manner described above in association with FIG. 1.

The amorophous silicon layer 76 is harder than the nickel-chromium layer 16. Since the nickel-chromium layer 16 is a thin-film layer, it will benefit from the hardness of the silicon layer 76. In particular, when the surface 17 of the thin-film nickel-chromium layer 16 in FIG. 3 is polished in the same manner described above in association with FIG. 1, the presence of the silicon intermediate layer 76 below the finish layer 16 will cause the surface 17 to have a higher degree of smoothness in the mirror 70 of FIG. 3 than in the mirror 10 of FIG. 1. In particular, the surface 17 in FIG. 3 will have a surface finish of approximately 10 to 15 Angstroms RMS.

Figure 4:
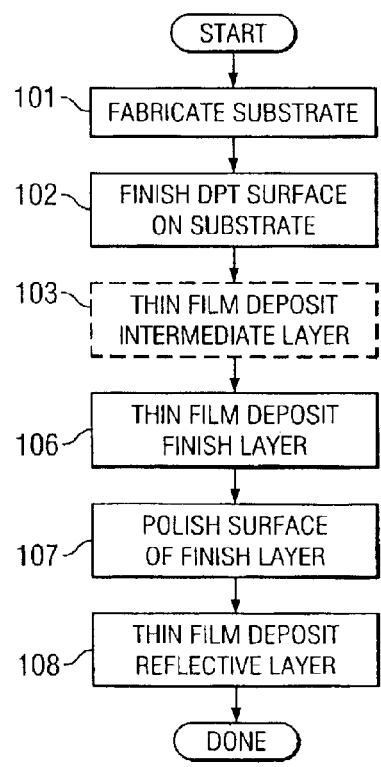
FIG. 4 is a flowchart showing a process which can be used to make the mirrors of FIGS. 1–3.

FIG. 4 is a flowchart showing a process which can be used to fabricate each of the mirrors 10, 40 and 70 of FIGS. 1–3.

The process begins at block 101, where the substrate 12 is fabricated. As discussed above, the substrate 12 in each disclosed embodiment is made from well-known aluminum 6061-T6 material, but could alternatively be made from some other suitable material. At block 102, the surface 13 on the substrate 12 is finished using known DPT techniques, thereby giving the surface 13 a surface finish of about 80 Angstroms RMS.

Block 103 is shown in broken lines in FIG. 4, in order to indicate that block 103 is carried out during fabrication of the mirror 70 of FIG. 3, but is not carried out during fabrication of the mirrors 10 and 40 of FIGS. 1 and 2. In block 103, the intermediate layer 76 of amorphous silicon is formed on the surface 13 of the substrate 12, using thin-film vapor deposition techniques.

In block 106, the finish layer is formed using thin-film vapor deposition techniques. In the mirrors 10 and 70 of FIGS. 1 and 3, the finish layer is the nickel-chromium layer 16, whereas in the mirror 40 of FIG. 2, the finish layer is the amorphous silicon layer 46. In block 107, the surface 17 or 47 of the finish layer is polished in the manner explained above. This yields a surface finish of approximately 20 to 25 Angstroms RMS for the surface 17 in the embodiment of FIG. 1, a surface finish of approximately 10 to 15 Angstroms RMS for the surface 47 in the embodiment of FIG. 2, or a surface finish of approximately 10 to 15 Angstroms RMS for the surface 17 in the embodiment of FIG. 3.

In block 108, the thin reflective layer 21 is formed over the surface of the finish layer, using thin-film vapor deposition techniques. As discussed above, the reflective layer 21 in each of the disclosed embodiments is made from silver, but could alternatively be any other suitable reflective material, such as gold or aluminum.

The present invention provides a number of technical advantages. One such advantage involves the provision of a mirror having a reflective surface with a high degree of smoothness, for example in the range of about 10 to 25 Angstroms RMS, depending on the specific structure of the mirror. This degree of smoothness is particularly advantageous when the mirror is used for radiation with relatively short wavelengths less than about 3 microns, such as visible radiation. A further advantage is that such a mirror can be fabricated with only one diamond point turning operation, which reduces the time and cost involved in its fabrication. The mirror is thus easier and cheaper to make than pre-existing mirrors, but is also more accurate.

Another advantage is that, by finishing the surface of the finish layer using a polishing operation rather than diamond point turning, the finish layer can be a thin-film layer which is sufficiently thin so that the finish layer and the substrate do not exhibit a bi-metallic effect that causes bending of the mirror in response to temperature variations. Still another advantage is that the single diamond point turning operation and the formation of the various thin-film layers can be carried out using known equipment and techniques, thereby avoiding the need for development and/or purchase of custom manufacturing equipment which is expensive and has no other meaningful use.

Although selected embodiments have been illustrated and described in detail, it will be understood that various substitutions and alterations are possible without departing from the spirit and scope of the present invention, as defined by the following claims.

What is claimed is:

1. An apparatus comprising a mirror which includes:
    a substrate having a surface;
    a thin-film finish layer deposited over said surface of said substrate and having on a side thereof opposite from said substrate a surface that is polished to improve a finish of the surface; and
    a reflective layer provided outwardly from said surface of said finish layer.

2. An apparatus according to claim 1, wherein said finish layer is sufficiently thin so that, in response to temperature variations, said mirror is substantially free from bending due to differences in thermal coefficients of expansion for said substrate and said finish layer.

3. An apparatus according to claim 1, wherein said finish layer has a thickness less than approximately 0.0001 inch.

4. An apparatus according to claim 1, wherein said finish layer is silicon.

5. An apparatus according to claim 1, wherein said finish layer is nickel-chromium.

6. An apparatus comprising a mirror which includes:
    a substrate having a surface;
    a thin-film finish layer provided over said surface of said substrate and having on a side thereof opposite from said substrate a surface that is polished to improve a finish of the surface, said finish layer comprising nickel-chromium; and
    a thin-film intermediate layer disposed between said substrate and said finish layer.

7. An apparatus according to claim 6, wherein said intermediate layer is silicon.

8. An apparatus comprising a mirror which includes:
    a substrate having a surface;
    a thin-film finish layer provided over said surface of said substrate and having on a side thereof opposite from said substrate a surface that is polished to improve a finish of the surface; and
    a thin-film intermediate layer disposed between said substrate and said finish layer.

9. An apparatus according to claim 8, wherein said intermediate layer has a thickness less than approximately 0.0001 inch.

10. An apparatus according to claim 1, wherein the reflective layer comprises a thin-film reflective layer provided over said surface of said finish layer.

11. An apparatus according to claim 10, wherein said reflective layer is one of gold, silver and aluminum.

12. An apparatus according to claim 1, wherein said surface on said substrate has a diamond-point-turned finish.

13. An apparatus according to claim 1, wherein said finish of said surface on said finish layer is a finish less than approximately 25 Angstroms RMS.

14. An apparatus according to claim 13, wherein said finish of said surface on said finish layer is a finish less than approximately 20 Angstroms RMS.

15. An apparatus according to claim 14, wherein said finish of said surface on said finish layer is a finish less than approximately 15 Angstroms RMS.

16. An apparatus according to claim 1, wherein said substrate is an aluminum alloy.

17. An apparatus comprising:
    a substrate having a substrate surface;
    a thin-film intermediate layer disposed outwardly from the substrate surface of the substrate;
    a thin-film finish layer deposited outwardly from the intermediate layer, the finish layer having a side opposite from the intermediate layer, the side having a finish layer surface that is polished to improve a finish of the finish layer surface; and a reflective layer disposed outwardly from the finish layer surface of the finish layer.

18. An apparatus according to claim 17, wherein the finish layer is sufficiently thin so that, in response to temperature variations, said mirror is substantially free from bending due to differences in thermal coefficients of expansion for the substrate and the finish layer.

19. An apparatus according to claim 17, wherein the finish layer has a thickness less than approximately 0.0001 inch.

20. An apparatus according to claim 17, wherein the finish layer comprises silicon.

21. An apparatus according to claim 17, wherein the finish layer comprises nickel-chromium.

22. An apparatus according to claim 17, wherein the intermediate layer comprises silicon.

23. An apparatus according to claim 17, wherein the intermediate layer has a thickness less than approximately 0.0001 inch.

24. An apparatus according to claim 17, wherein the reflective layer comprises one of gold, silver, and aluminum.

25. An apparatus according to claim 17, wherein the substrate surface has a diamond-point-turned finish.

26. An apparatus according to claim 17, wherein the substrate comprises an aluminum alloy.

27. An apparatus according to claim 17, wherein the finish of the finish layer surface is a finish less than approximately 25 Angstroms RMS.

28. An apparatus according to claim 17, wherein the finish of the finish layer surface is a finish less than approximately 20 Angstroms RMS.

29. An apparatus according to claim 17, wherein the finish of the finish layer surface is a finish less than approximately 15 Angstroms RMS.

* * * * *

UNITED STATES PATENT AND TRADEMARK OFFICE
CERTIFICATE OF CORRECTION

PATENT NO.       : 6,921,177 B2                                             Page 1 of 1
APPLICATION NO.  : 10/373448
DATED            : July 26, 2005
INVENTOR(S)      : John P. Schaefer It is certified that error appears in the above-identified patent and that said Letters Patent is hereby corrected as shown below:

On the Title page Item (56) References Cited, under 6,495,272 B1, 12/2002, replace "Guttin" with -- Creber et al. --.

Signed and Sealed this

Third Day of July, 2007

JON W. DUDAS
*Director of the United States Patent and Trademark Office*